(12) United States Patent
Frederick et al.

(10) Patent No.: US 8,844,126 B2
(45) Date of Patent: Sep. 30, 2014

(54) METHOD OF MANUFACTURING AN ELECTRICAL CONNECTOR

(75) Inventors: Jeff Frederick, Foothill Ranch, CA (US); Steve Rust, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 184 days.

(21) Appl. No.: 13/315,759

(22) Filed: Dec. 9, 2011

(65) Prior Publication Data

US 2012/0174398 A1 Jul. 12, 2012

Related U.S. Application Data

(60) Provisional application No. 61/478,815, filed on Apr. 25, 2011, provisional application No. 61/426,954, filed on Dec. 23, 2010.

(51) Int. Cl.
| | |
|---|---|
| *H01R 43/20* | (2006.01) |
| *H01R 13/33* | (2006.01) |
| *H01R 13/187* | (2006.01) |
| *H01R 13/17* | (2006.01) |
| H01R 13/24 | (2006.01) |
| B21F 3/02 | (2006.01) |
| F16F 1/04 | (2006.01) |
| H01R 24/58 | (2011.01) |

(52) U.S. Cl.
CPC ............ *H01R 13/33* (2013.01); *H01R 13/2421* (2013.01); *B21F 3/02* (2013.01); *H01R 13/2492* (2013.01); *F16F 1/045* (2013.01); *H01R 13/187* (2013.01); *H01R 24/58* (2013.01); *H01R 13/17* (2013.01)

USPC ............... 29/876; 29/592.1; 29/830; 29/835; 29/844; 361/816; 361/818; 439/488; 439/567; 439/591; 439/597

(58) Field of Classification Search
USPC ............. 29/592.1, 830, 835, 844; 439/79, 86, 439/91.66, 488, 491, 567, 591, 597; 361/816, 818
See application file for complete search history.

(56) References Cited

U.S. PATENT DOCUMENTS

| | | | |
|---|---|---|---|
| 4,451,770 A | * | 5/1984 | Boettner et al. ............... 318/727 |
| 4,655,462 A | | 4/1987 | Balsells |
| 4,678,210 A | | 7/1987 | Balsells |
| 4,826,144 A | | 5/1989 | Balsells |
| 4,876,781 A | | 10/1989 | Balsells |
| 4,907,788 A | | 3/1990 | Balsells |
| 4,915,366 A | | 4/1990 | Balsells |
| 4,961,253 A | | 10/1990 | Balsells |
| 4,964,204 A | | 10/1990 | Balsells |
| 5,012,807 A | | 5/1991 | Stutz, Jr. |
| 5,076,270 A | | 12/1991 | Stutz, Jr. |
| 5,082,390 A | | 1/1992 | Balsells |
| 5,139,243 A | | 8/1992 | Balsells |
| 5,160,122 A | | 11/1992 | Balsells |
| 5,411,348 A | | 5/1995 | Balsells |

(Continued)

*Primary Examiner* — Paul D Kim
(74) *Attorney, Agent, or Firm* — Klein, O'Neill & Singh, LLP

(57) ABSTRACT

Electrical resistance between a male part and a female part through a canted spring is disclosed using mathematical modeling. Increase or decrease in resistance can be quickly analyzed by looking at the equivalence resistance and the number of contacts at the input side, the output side, or both. The number of contacts may also be created by forming a dimple having a discontinuity.

18 Claims, 6 Drawing Sheets

(56) References Cited

U.S. PATENT DOCUMENTS

| | | |
|---|---|---|
| 5,503,375 A | 4/1996 | Balsells |
| 5,545,842 A | 8/1996 | Balsells |
| 5,615,870 A | 4/1997 | Balsells |
| 5,709,371 A | 1/1998 | Balsells |
| 5,791,638 A | 8/1998 | Balsells |
| 6,749,358 B2 | 6/2004 | Balsells |
| 6,835,084 B2 | 12/2004 | Poon et al. |
| 6,895,276 B2 | 5/2005 | Kast et al. |
| 7,055,812 B2 | 6/2006 | Balsells |
| 7,070,455 B2 | 7/2006 | Balsells |
| 7,195,523 B2 | 3/2007 | Naviaux |
| 7,274,964 B2 * | 9/2007 | Balsells ............ 607/37 |
| 7,601,033 B2 | 10/2009 | Ries et al. |
| 7,822,477 B2 | 10/2010 | Rey et al. |
| 2003/0157846 A1 * | 8/2003 | Poon et al. ............ 439/840 |
| 2005/0186829 A1 * | 8/2005 | Balsells ............ 439/352 |
| 2008/0208278 A1 | 8/2008 | Janzig et al. |
| 2008/0245231 A1 | 10/2008 | Gniesmer et al. |
| 2008/0255631 A1 | 10/2008 | Sjostedt et al. |

* cited by examiner

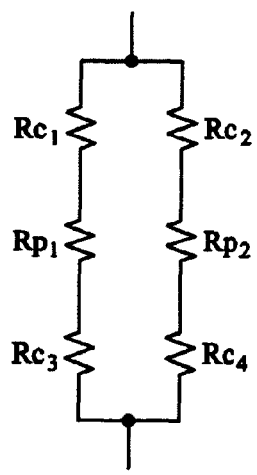
*FIG. 11*
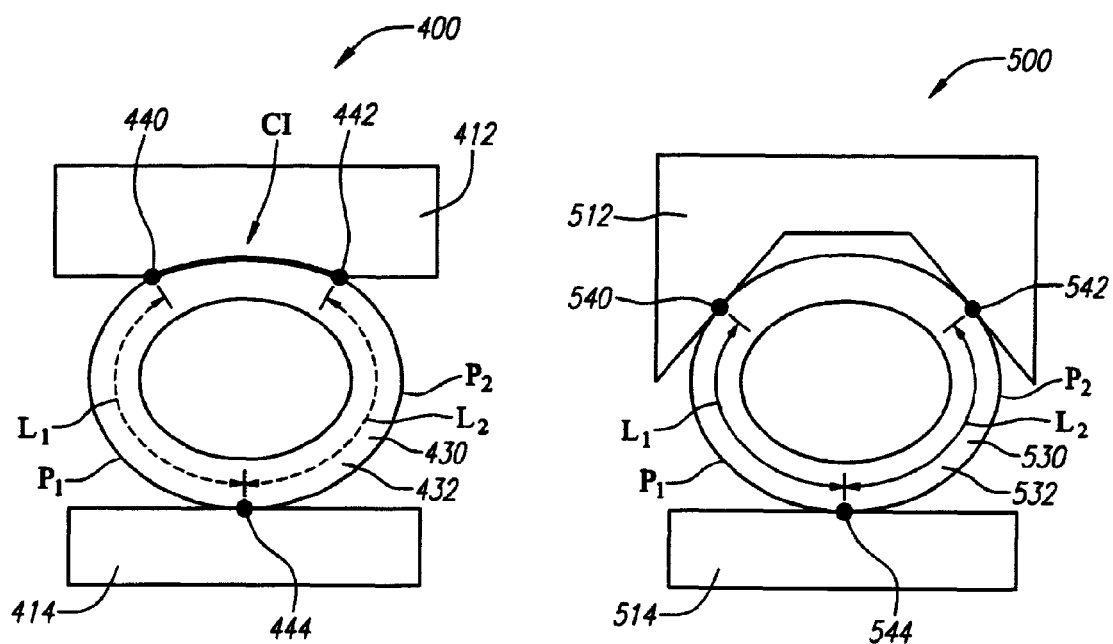
*FIG. 12*  *FIG. 13*

METHOD OF MANUFACTURING AN ELECTRICAL CONNECTOR

CROSS-REFERENCE TO RELATED APPLICATION

This is a regular utility application of provisional application No. 61/478,815, filed Apr. 25, 2011, and of provisional application Ser. No. 61/426,954, filed Dec. 23, 2010, the entire contents of each of which are expressly incorporated herein by reference.

BACKGROUND

Aspects of the disclosed embodiments relate to electrical connectors. Canted coil springs may be used to electrically connect two parts. A first part is a female part such that a bore extends through the part and can receive a second part, which is a male part. The male part may be shaped similar to a pin, shaft, plug, shank or the like and may have an outer surface with a shape corresponding to the shape of the bore. The outer diameter of the pin is smaller than the inner diameter of the bore to allow insertion of the pin into the bore and removal of the pin from the bore. The inner surface of the bore includes a groove for retaining a canted coil spring, which may instead be located on the pin and the combination configured to be inserted into the bore. In conventional current conducting applications of canted coil springs, the pin is inserted into the bore such that the outer surface of the pin contacts the canted coil spring. The canted coil spring establishes a connection between the outer surface of the pin and the inner surface of the bore. Accordingly, the canted coil spring facilitates flow of electrical current between the two parts.

SUMMARY

An electrical connector is provided. In one example, the connector comprises a piston, a housing, and a canted coil spring comprising a plurality of spring coils. Wherein a single groove is incorporated in the housing or in the piston but not both the housing and the piston. The single groove is configured for accommodating the canted coil spring. Wherein at least one of the spring coils has a dimple formed upon the coil to define a section having a discontinuity.

According to aspects of the disclosure, an electrical connector for electrical applications uses a canted coil spring between two components to transfer current between them. In one embodiment, at least one of the components has a V-shaped groove to contact at least one coil of the canted coil spring at two contact points. In another embodiment, both components include a V-shaped groove to provide multiple points of contact per coil for increased current carrying capability and decreased contact resistance. In yet another embodiment, both components have a curved groove to provide continuous contact surfaces with at least one coil of the spring. In yet another embodiment, one or both of the grooves are configured to reduce both contact resistance between the two components and the canted coil spring, and path resistance during transfer of electrical current through the canted coil spring from one component to the other component.

A method for increasing a number of contact points in a single groove electrical connector assembly is provided. The method comprising providing a housing; providing a piston; providing a canted coil spring having a plurality of spring coils; and providing a groove in the housing or in the piston but not both the housing and the piston. The groove being sized and configured for accommodating the canted coil spring. The method further comprising providing a dimple having a discontinuity formed upon at least one of the spring coils; and wherein the dimple forms two contact points when contacting the at least one of the spring coils with the dimple against a generally flat surface.

In another aspect of the present assembly, an electrical connector is provided comprising a piston, a housing, and a canted coil spring comprising a plurality of spring coils. A groove is incorporated in the housing or in the piston or both. The groove is configured for accommodating the canted coil spring and a separate groove may be incorporated adjacent the groove for accommodating another canted coil spring. Wherein at least one spring coil of the plurality of coils has a dimple formed thereon to define a section having a discontinuity.

In another example, all of the plurality of spring coils each comprising a dimple formed thereon to define a section having a discontinuity.

In another example, the spring is formed from a multi-metallic wire.

In another example, the housing has the groove and wherein the at least one of the spring coils has two contact points with the housing and two contact points with a generally planar surface on the piston.

In another example, the piston has the groove and wherein the at least one of the spring coils has two contact points with the piston and two contact points with a generally planar surface on the housing.

In still another example, an equivalent resistance for a circuit formed from the connector assembly is 50% less than an equivalent resistance formed from a circuit made from a similar connector assembly but without the dimple formed upon the coil.

In a further aspect of the present method, a method of forming a spring is provided. The method comprising the steps of forming a plurality of coils from a wire, canting the plurality of coils in a same canting direction, and forming a dimple on at least one coil of the plurality of coils to form a section having a discontinuity.

In yet another example, the method further comprises the step of forming a dimple on each of the plurality of coils.

In yet another example, the method further comprises the step of welding two end coils to from a garter-type canted coil spring.

In yet another example, the wire is made from a copper material.

In yet another example, the wire is made from a multi-metallic wire.

In yet another example, the multi-metallic wire comprises a copper inner core and a high tensile strength outer layer.

The method of forming the spring can further comprise the step of forming a second dimple on the at least one coil at a location opposite the dimple.

A still further aspect of the present method is a method of increasing a number of contact points in a spring groove comprising the steps of providing a housing; providing a piston; providing a canted coil spring having a plurality of spring coils; and forming a common groove between the housing and the piston. The common groove can comprise two side walls and a groove bottom located therebetween. The method further comprising the step of providing a dimple having a discontinuity formed upon at least one of the spring coils and wherein the dimple forms two contact points against a generally flat surface of the common groove.

In yet another example, the method further comprises the step of providing a dimple having a discontinuity formed upon all of the plurality of coils.

In yet another example, the method further comprises the step of providing a second dimple having a discontinuity formed upon the at least one of the spring coils at a location opposite the dimple.

In yet another example, the method further comprises the step of providing a second dimple having a discontinuity upon all of the plurality of coils.

The method can include providing the groove bottom on the piston and forming a V-groove with the two side walls in a bore of the housing.

The method can include providing the groove bottom in the housing and forming a V-groove with the two side walls on the piston.

The various embodiments of the present electrical connector have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description" one will understand how the features of the present embodiments provide various advantages.

BRIEF DESCRIPTION OF THE DRAWINGS

The various embodiments of the present electrical connector will be discussed in detail with an emphasis on highlighting the advantageous features. These embodiments depict the novel and non-obvious electrical connector shown in the accompanying drawings, which are for illustrative purposes only. These drawings include the following figures, in which like numerals indicate like parts:

FIG. 11 is an electrical circuit representing contact resistances and path resistances of the electrical connector of FIG. 7.

FIG. 12 is a front cross-sectional view of an electrical connector according to another exemplary embodiment.

FIG. 13 is a front cross-sectional view of an electrical connector according to another exemplary embodiment.

Figure 1:
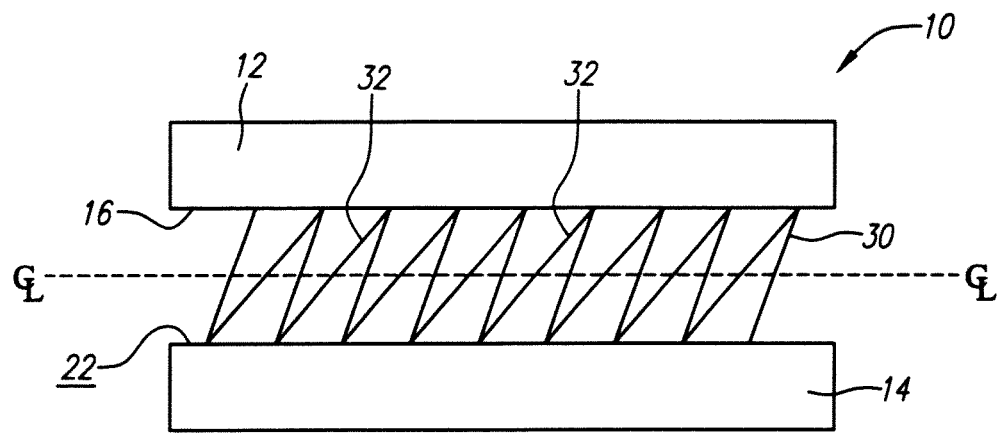
FIG. 1 is a side cross-sectional view of an electrical connector according to one exemplary embodiment.

The following detailed description describes the present embodiments with reference to the drawings. In the drawings, reference numbers label elements of the present embodiments. These reference numbers are reproduced below in connection with the discussion of the corresponding drawing features.

DETAILED DESCRIPTION

The detailed description set forth below in connection with the appended drawings is intended as a description of embodiments of an electrical connector with a canted coil spring and methods for using the same and are not intended to represent the only forms in which the present assemblies and methods may be constructed or used. The description sets forth the features and the steps for using and constructing an electrical connector with a canted coil spring and methods for using the same in connection with the illustrated embodiments. It is to be understood, however, that the same or equivalent functions and structures may be accomplished by different embodiments that are also intended to be encompassed within the spirit and scope of the assemblies and methods. As denoted elsewhere herein, like element numbers are intended to indicate like or similar elements or features.

Figure 2:
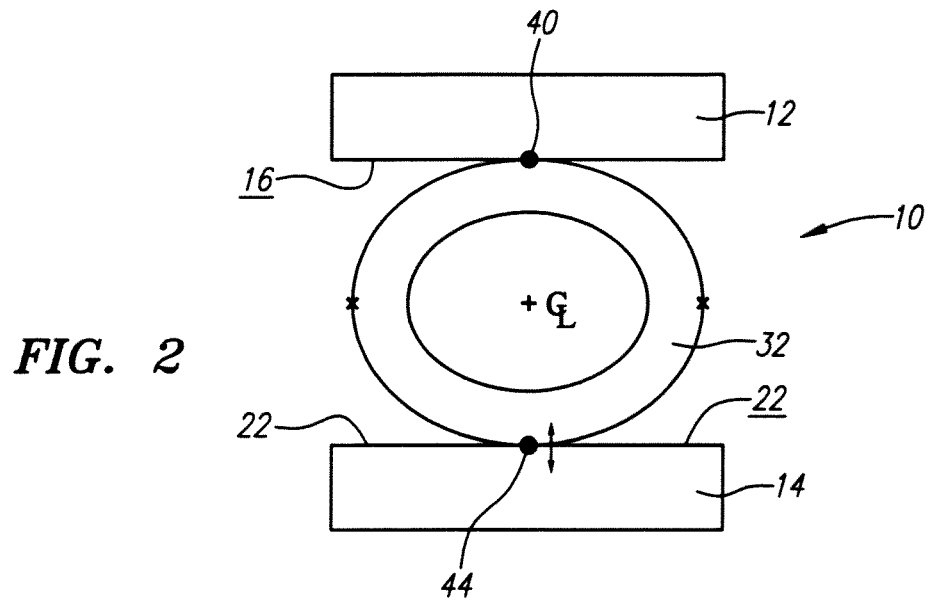
FIG. 2 is a front cross-sectional view of the electrical connector of FIG. 1.

FIGS. 1 and 2 show an electrical connector 10 according to one exemplary embodiment. The electrical connector includes an input side 12 and an output side 14. The input side 12 includes a generally flat contact surface 16. The output side 14 includes a generally flat contact surface 22. A canted coil spring 30 connects the input side 12 to the output side 14 and facilitates flow of electrical current from the input side 12 to the output side 14. The canted coil spring 30 is formed by a plurality of coils 32 that are canted at an acute angle relative to a centerline ₵ extending through the coils. The two end coils can be connected to form a garter-type spring. The canted coil springs discussed herein are similar to exemplary canted coil springs disclosed in U.S. Pat. Nos. 4,655,462; 4,826,144; 4,876,781; 4,907,788; 4,915,366; 4,961,253; 4,964,204; 5,139,243; 5,160,122; 5,503,375; 5,615,870; 5,709,371; 5,791,638; and 7,055,812 and in co-pending application Ser. No. 12/102,626, filed Apr. 14, 2008 and Ser. No. 12/767,421, filed Apr. 26, 2010, the contents of which are expressly incorporated herein by reference. Furthermore, the connectors discussed herein are similar to exemplary connectors disclosed in U.S. Pat. Nos. 4,678,210; 5,081,390; 5,411, 348; 5,545,842; 6,749,358; 6,835.084; 7,070,455; and 7,195, 523, the contents of which are expressly incorporated herein by reference.

Figure 3:
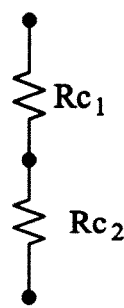
FIG. 3 is a diagram of an electrical circuit representing contact resistances of the electrical connector of FIG. 1.

The coils 32 of the canted coil spring 30 contact the contact surface 16 of the input side 12 at a contact point 40. The coils 32 of the canted coil spring 30 contact the contact surface 22 of the output side 14 at a contact point 44. The point contact between the flat contact surfaces 16 and 22 and the circular or elliptical coils of the canted coil spring 30 is referred to herein as a purely mathematical concept. One of ordinary skill in the art will readily recognize that the actual contact between the canted coil spring 30 and the flat surfaces 16 and 22 occurs at small contact areas, respectively. The input side 12 transfers electrical current to the canted coil spring 30 through the contact point 40. Accordingly, the transfer of current at the contact point 40 creates a first contact resistance RC1. The canted coil spring 30 then transfers the electrical current to the output side 14 through the contact point 44. Accordingly, the transfer of current at the contact point 44 creates a second contact resistance RC2. FIG. 3 shows an equivalent circuit representing contact resistances RC1 and RC2. Contact resistances RC1 and RC2 are in series. Therefore, an approximate equivalent resistance. Req for the circuit of FIG. 3 is computed using Ohm's Law and represented by equation 1 as follows:

$$Req \sim RC1 + RC2 \quad (1)$$

Assuming that the input side 12 and the output side 14 are constructed from the same materials and the contact points 40 and 44 are approximately the same size, then the resistances RC1 and RC2 may have substantially the same value, which is referred to herein as RC. Therefore, the equivalent resistance Req can be represented by equation 2 as follows:

$$Req \sim 2RC \quad (2)$$

Figure 4:
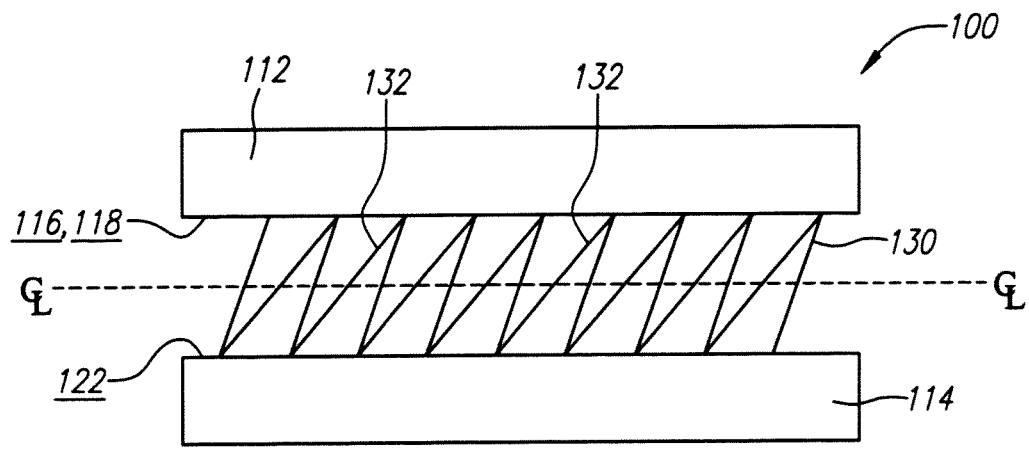
FIG. 4 is a side cross-sectional view of an electrical connector according to another exemplary embodiment.
Figure 5:
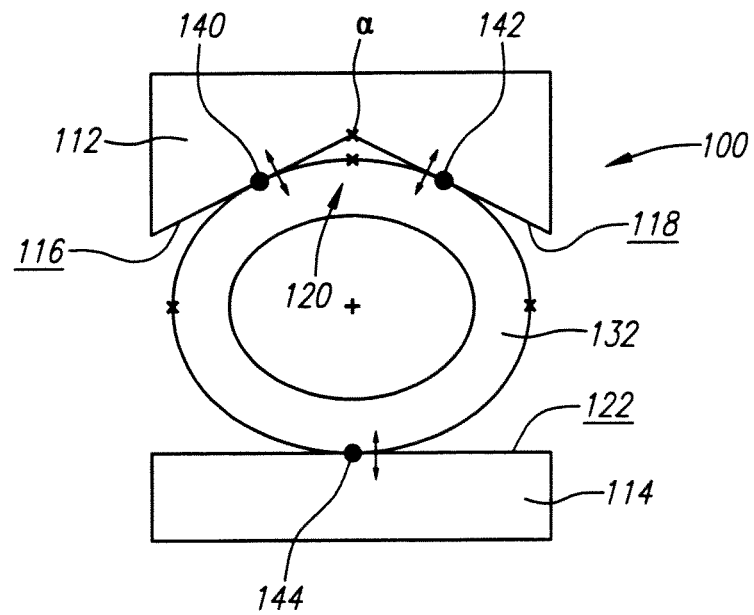
FIG. 5 is a front cross-sectional view of the electrical connector of FIG. 4.

FIGS. 4 and 5 show an electrical connector 100 according to a second exemplary embodiment. The electrical connector includes an input side 112 and an output side 114. The input side 112 includes a first contact surface 116 and a second contact surface 118 that are oriented at an angle α relative to each other, which are more clearly shown in FIG. 5. Accordingly, the contact surfaces 116 and 118 form a V-shaped groove or V-groove 120, the depth of which partially depends on the magnitude of the angle α. The output side 114 includes a flat contact surface 122. A canted coil spring 130 connects the input side 112 to the output side 114 and facilitates flow of electrical current from the input side 112 to the output side 114. The canted coil spring 130 is formed with a plurality of coils 132 that are canted at an acute angle relative to a centerline ₵ extending through the coils.

The V-shaped groove 120 of the input side 112 accommodates the canted coil spring 130 such that the canted coil spring 130 contacts the first contact surface 116 at a first contact point 140 and contacts the second contact surface 118 at a second contact point 142. The canted coil spring 130 contacts the contact surface 122 of the output side 114 at a third contact point 144. The input side 112 transfers electrical current to the canted coil spring 130 through the first contact point 140 and the second contact point 142. Accordingly, the transfer of current at the first contact point 140 creates a first contact resistance RC1. Similarly, the transfer of current at the second contact point 142 creates a second contact resistance RC2. The canted coil spring 130 then transfers the electrical current to the output side 114 through the third contact point 144. Accordingly, the transfer of current at the third contact point 144 creates a third contact resistance RC3.

Figure 6:
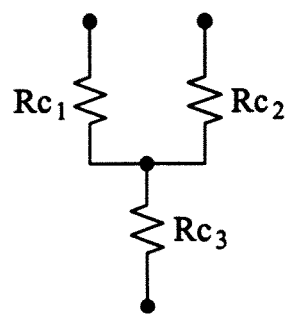
FIG. 6 is a diagram of an electrical circuit representing contact resistances of the electrical connector of FIG. 4.

FIG. 6 shows an equivalent circuit representing contact resistances RC1, RC2 and RC3. Contact resistances RC1 and RC2 are in parallel, and contact resistance RC3 is in series with the equivalent resistance of RC1 and RC2. An approximate equivalent resistance Req of the circuit shown in FIG. 6 can be computed using Ohm's Law and represented by equation 3 as follows:

$$Req \sim \frac{RC1 \, RC2}{(RC1 + RC2)} + RC3 \quad (3)$$

Assuming that the input side 112 and the output side 114 are constructed from the same materials, and the contact points 140, 142 and 144 are approximately the same size, then the resistances RC1, RC2 and RC3 may have substantially the same value, which is referred to herein as RC. Therefore, Req can be represent by equation 4 as follows:

$$Req \sim 1.5 RC \quad (4)$$

The equivalent resistance of the circuit in FIG. 6 is about 25% less than the equivalent resistance of the circuit in FIG. 3 by having the input side 112 contact the canted coil spring 130 at two contact points rather than only one. Accordingly, the electrical connector 100 is more efficient in conducting current than the electrical connector 10. However, in certain applications the higher equivalent resistance provided by the connector 10 may be preferred. For example, an application may require a certain level of heat to be generated at the electrical connector. Accordingly, the connector 10 may be more suitable for such applications as compared to the connector 100, because the higher equivalent resistance of the connector 10 causes more heat generation than the heat generation caused by the equivalent resistance of the connector 100.

If the input side 112 contacts the canted coil spring 130 at more than two contact points, then by designating n as the number of contact points between the input side 112 and the canted coil spring 130, and assuming that all of the contact points have the same contact resistance RC, then the equivalent contact resistance Req of the connector 100 can be approximately represented by equation 5 as follows:

$$Req \sim \frac{n+1}{n} RC \quad (5)$$
$$n = 2, 3, 4, \ldots$$

Based on equation 5, when the input side 112 contacts the canted coil spring 130 at two contact points. Req~1.5 RC, which is the scenario discussed above in the embodiment of FIGS. 4 and 5. As the number of contact points on the input side 112 increases, Req falls between 1 and 1.5, with Req~1 for a very large number of contact points. Thus, one of ordinary skill in the art will recognize that the larger the number of contact points between the input side 112 and the canted coil spring 130, the lower the equivalent contact resistance of the electrical connector 100 compared to similar structured connectors but with fewer contacts on the input side.

Figure 7:
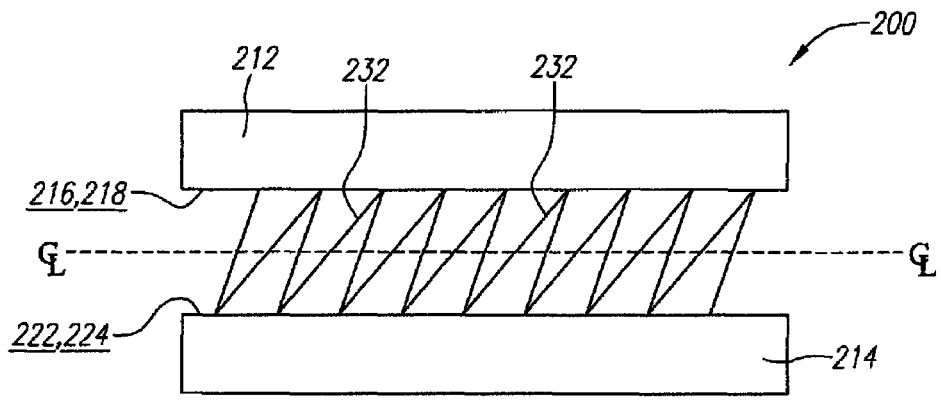
FIG. 7 is a side cross-sectional view of an electrical connector according to another exemplary embodiment.
Figure 8:
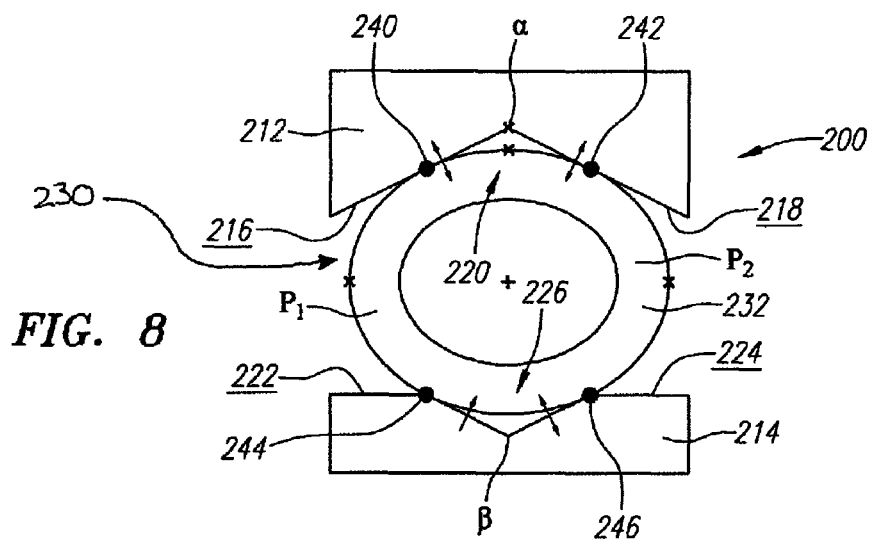
FIG. 8 is a front cross-sectional view of the electrical connector of FIG. 7.

FIGS. 7 and 8 show an electrical connector 200 according to a third exemplary embodiment. The electrical connector includes an input side 212 and an output side 214. The input side 212 includes a first contact surface 216 and a second contact surface 218 that are oriented at an angle α relative to each other. Accordingly, the contact surfaces 216 and 218 form a V-shaped groove or V-groove 220, the depth of which partially depends on the magnitude of the angle α. The output side 214 includes a first contact surface 222 and a second contact surface 224 that are oriented at an angle β relative to each other. Accordingly, the contact surfaces 222 and 224 form a V-shaped groove 226, the depth of which partially depends on the magnitude of the angle β. A canted coil spring 230 connects the input side 212 to the output side 214 and facilitates flow of electrical current from the input side 212 to the output side 214. The canted coil spring 230 is formed with a plurality of coils 232 (one coil shown in FIG. 5) that are canted at an acute angle relative to a centerline ₵ extending through the coils.

The V-shaped groove 220 of the input side 212 accommodates the canted coil spring 230 such that the canted coil spring 230 contacts the first contact surface 216 at a first contact point 240 and contacts the second contact surface 218 at a second contact point 242. The V-shaped groove 226 of the output side 214 accommodates the canted coil spring 230 such that the canted coil spring 230 contacts the first contact surface 222 at a third contact point 244 and contacts the second contact surface 224 at a fourth contact point 246. The input side 212 transfers electrical current to the canted coil spring 230 through the first contact point 240 and the second contact point 242. Accordingly, the transfer of current at the first contact point 240 creates a first contact resistance RC1. Similarly, the transfer of current at the second contact point 242 creates a second contact resistance RC2. Electrical current from canted coil spring 230 is transferred to the output side 214 through the third contact point 244 and the fourth contact point 246. Accordingly, the transfer of current at the third contact point 244 creates a third contact resistance RC3. Similarly, the transfer of current at the fourth contact point 246 creates a fourth contact resistance RC4.

Figure 9:
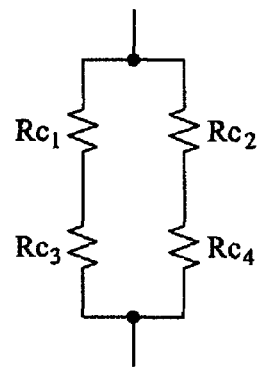
FIG. 9 is a diagram of an electrical circuit representing contact resistances of the electrical connector of FIG. 7.

FIG. 9 shows an equivalent circuit representing contact resistances RC1, RC2, RC3 and RC4. An approximate equivalent resistance Req of the circuit shown in FIG. 9 can be computed using Ohm's Law and represented by equation 6 as follows:

$$Req \sim \frac{(RC1 + RC3)(RC2 + RC4)}{(RC1 + RC2 + RC3 + RC4)} \quad (6)$$

Assuming that the input side 212 and the output side 214 are constructed from the same materials, and the contact points 240, 242, 244 and 246 are approximately the same size, then the resistances RC1, RC2, RC3 and RC4 may have substantially the same value, which is referred to herein as RC. Therefore, Req can be represent by equation 7 as follows:

$$Req \sim RC \quad (7)$$

The equivalent resistance of the circuit in FIG. 9 is approximately 33% less than the equivalent resistance of the circuit in FIG. 6 by having the output side 214 contact the canted coil spring 230 at two contact points rather than only one. Furthermore, the equivalent resistance of the circuit in FIG. 9 is about 50% less than the equivalent resistance of the circuit in FIG. 3, because each of the input side 212 and the output side 214 contacts the canted coil spring 230 at two contact points rather than only one. Accordingly, the electrical connector 200 is more efficient than the electrical connector 100 and the electrical connector 10 at transferring current from the input side to the output side. However, in certain applications the higher equivalent resistance provided by the connector 10 or the connector 100 may be preferred. For example, an application may require a certain level of heat to be generated at the electrical connector. Accordingly, the electrical connector 10 or the electrical connector 100 may be more suitable for such applications as compared to the connector 200, because the higher equivalent resistances of the connector 10 or the connector 100 causes more heat generation than the heat generation caused by the equivalent resistance of the connector 200.

Based on the above, one of ordinary skill in the art will appreciate that the number of contacts between a canted coil spring, the input side and the output side can affect the equivalent resistance of the electrical connector. The greater the number of contacts between the canted coil spring, the input side and the output side, the lower the equivalent resistance of the electrical connector. In the embodiments of FIGS. 7-9, up to two contacts on the input side and two contacts on the output side are provided. For example, if up to four contacts on the input side and four contacts on the output side are provided, the equivalent contact resistance of the electrical connector is approximately 0.5 RC, assuming that contact resistances at all of the contacts are generally similar.

Figure 10:
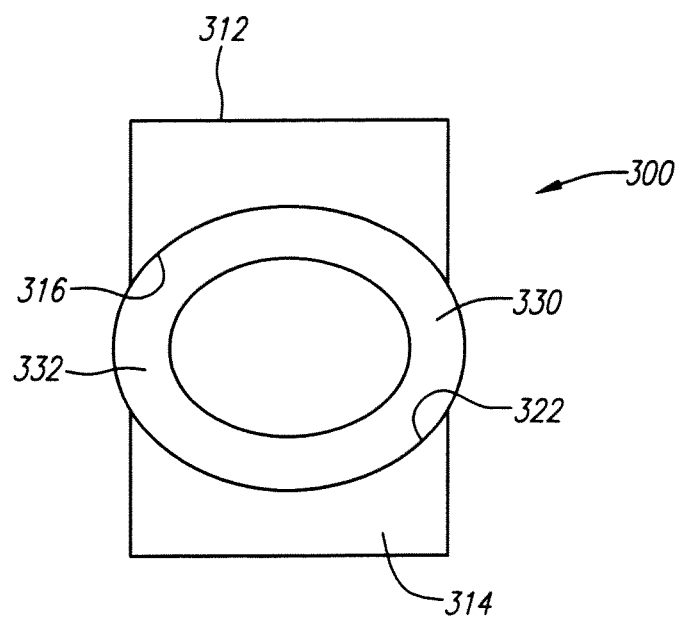
FIG. 10 is a front cross-sectional view of an electrical connector according to another exemplary embodiment.

FIG. 10 shows an electrical connector 300 according to one exemplary embodiment. The electrical connector includes an input or input side 312 and an output or output side 314. The input side 312 includes a generally curved contact surface 316. The output side 314 also includes a generally curved contact surface 322. A canted coil spring 330 connects the input side 312 to the output side 314 and facilitates flow of electrical current from the input side 312 to the output side 314. The canted coil spring 330 is formed by a plurality of coils 332 (one coil shown in FIG. 10) that are canted at an acute angle relative to a centerline ₵ (shown extending through the page in FIG. 10) extending through the coils.

The canted coil spring 330 may contact the entire contact surface 316 and the entire contact surface 322, especially when the input side 312 and the output side 314 compress the canted coil spring 330. In other words, the electrical connector 300 provides a lame number of contact points between the canted coil spring 330, the input side 312 and the output side 314 as compared to the electrical connectors 10, 100 and 200. Accordingly, the equivalent contact resistance of the electrical connector 300 is less than the equivalent contact resistances of the electrical connectors 10, 100 and 200.

In the embodiment of FIG. 10, the input side 312 and the output side 314 contact the canted coil spring 330 at a large number of contact points. Designating n as the number of contact points on each of the input side 312 and the output side 314, and assuming that all contact points have the same contact resistance, the equivalent contact resistance of the connector 300 can be approximately represented by equation 8 as follows:

$$Req \sim \frac{2}{n} RC \quad (8)$$
$$n = 2, 3, 4, \ldots$$

Based on equation 8, when each of the input side 312 and the output side 314 contacts the canted coil spring 330 at two contact points. Req~1, which is the scenario discussed above in the embodiment of FIGS. 7 and 8. As the number of contact points on each of the input side 312 and the output side 314 increases, Req falls between 0 and 1, with the Req approaching zero for a very large number of contact points (i.e., Req~0 when n=∞ in a purely mathematical model of the electrical connector). Thus, one of ordinary skill in the art will recognize that the larger the number of contact points between the input side 312 and the canted coil spring 330 and the output side 314 and the canted coil spring 330, the lower the equivalent contact resistance of the electrical connector 300.

The exemplary electrical connectors disclosed herein may be used in any application where electrical current is transferred from one part to another with a canted coil spring. For example, the input side can be a bore of an electrical outlet or socket and the output side can be the shaft of an electrical plug. Other non-limiting examples include a stem from a car battery and a clamp from a car engine, and an audio jack and an audio transmitter. Heat transfer properties of the electrical connectors discussed herein are analogous to their contact resistance properties. Accordingly, the same principles regarding efficient transfer of current depending on the extent of contact between the spring, the input side and the output side are equally applicable to heat transfer between these parts. For example, heat is transferred more efficiently from the input side to the output side through the spring 330 of the electrical connector 300 of FIG. 10 than spring 230 of the electrical connector 200 of FIGS. 7-9. Similarly, heat is transferred more efficiently from the input side to the output side through the spring 230 of the electrical connector 200 of FIGS. 7-9 than the spring 130 of the electrical connector 100 of FIGS. 4-6. Thus, the present disclosure is not limited to electrical connectors and is applicable to connections for heat transfer from one part to another.

In the above embodiments only contact resistances are discussed, which are created because of the contact between the input side and the canted coil spring and between the output side and the canted coil spring. Referring for example to the embodiments of FIGS. 7 and 8, the coils 232 of the spring also create a path resistance as the current flows through the coils 232 from the input side 212 to the output side 214. This path resistance is referred to herein as RP. FIG. 11 is a circuit diagram that illustrates both the contact resistances RC and path resistances RP of the electrical connector 200 of FIGS. 7 and 8. Referring to FIG. 8, the section P1 of the coil 232 between the contact point 240 and the contact point 244 creates a path resistance RP1 as current flows from the contact point 240 to contact point 244. Similarly, the section P2 of the coil 232 between the contact point 242 and the contact point 246 creates a path resistance RP2 as current flows from the contact point 242 to contact point 246. Assuming that the coil sections P1 and P2 have the same geometry, have the same dimensions, and are constructed from the same materials, the values of RP1 and RP2 largely dependent on the length of the sections P1 and P2, respectively. Accordingly, the closer the contact points are to each other, the lower the path resistance will be between the input side 212 and the output side 214. The resistance created due to flow of electrical current through the canted coil spring from the input side to the output side is further described in co-pending patent application Ser. No. 12/691,564, filed Jan. 21, 2010, the contents of which are expressly incorporated herein by reference.

FIG. 11 illustrates an equivalent circuit representing contact resistances RC1, RC2, RC3 and RC4, and path resistances RP1 and RP2. An approximate equivalent resistance Req of the circuit shown in FIG. 11 can be computed using Ohm's Law and represented by equation 9 as follows:

$$Req \sim \frac{(RC1 + RP1 + RC3)(RC2 + RP2 + RC4)}{(RC1 + RC2 + RC3 + RC4 + RP1 + RP2)} \quad (9)$$

Assuming that the input side 212 and the output side 214 are constructed from the same materials, and the contact points 240, 242, 244 and 246 are approximately the same size, then the resistances RC1, RC2, RC3 and RC4 may have substantially the same value, which is referred to herein as RC. Also, assuming that the sections P1 and P2 of the coil 232 have the same length, have the same geometry, have the same dimensions, and are constructed from the same materials, then RP1 and RP2 have substantially the same value, which is referred to herein as RP. Therefore, equation 9 can be rewritten as follows:

$$Req \sim RC + 0.5 RP \quad (10)$$

The analysis provided above can be similarly applied to the other embodiments disclosed herein. Accordingly, the equivalent resistance for any electrical connector having two parts connected with a spring can be computed using Ohm's Law. Furthermore, an electrical connector can be designed to have a preferred equivalent resistance depending on the application in which the electrical connector is utilized. For example, for an application that requires an electrical connector with as low an equivalent resistance as possible, the number of contact points are increased (e.g. see the embodiment of FIG. 10) and/or the distance between the contact points are reduced in order to reduce the path resistance. In contrast, for an application that requires an electrical connector with a high equivalent resistance, the number of contact points is reduced and/or the distance between the contact points are increased in order to increase the path resistance.

As discussed below, increasing the number of contact points to reduce contact resistance does not necessarily lead to reduced path resistance or vice versa. Referring to FIG. 12, an electrical connector 400 is shown having a large number of contact points in a contact area CI because of substantially continuous contact between the input side 412 and the canted coil spring 430. The output side 414 contacts the canted coil spring 430 at a contact point 444. A section P1 of a coil 432 extends from an edge 440 of the contact area CI to the contact point 444 with a radial length L1. A section P2 extends between an edge 442 of the contact area CI to the contact point 444 with a radial length L2. Referring to FIG. 13, an electrical connector 500 is shown having two contact points 540 and 542 between the input side 512 and the canted coil spring 530. The output side 514 contacts the canted coil spring 530 at a contact point 544. The section P1 of the coil 532 extends between contacts 540 and 544 with a radial length L1, and the section P2 of the coil 532 extends between contacts 542 and 544 with a radial length L2. The equivalent contact resistance in the embodiment of FIG. 12 is less than the equivalent contact resistance in the embodiment of FIG. 13 because the input side 412 contacts the spring 430 with a larger number of contact points than the number of contact points between the input side 512 and the spring 530. However, the equivalent path resistance in the embodiment of FIG. 12 is greater than the equivalent path resistance in the embodiment of FIG. 13 because the radial lengths L1 and L2 of the sections P1 and P2, respectively, of the coil 432 are greater than the radial lengths L1 and L2 of the sections P1 and P2, respectively, of the coil 532. Thus, one of ordinary skill in the art will recognize from the exemplary embodiments of FIGS. 12 and 13 that an electrical connector can be designed to provide a preferred contact and/or path resistance properties that are suitable for a particular application.

Figure 14:
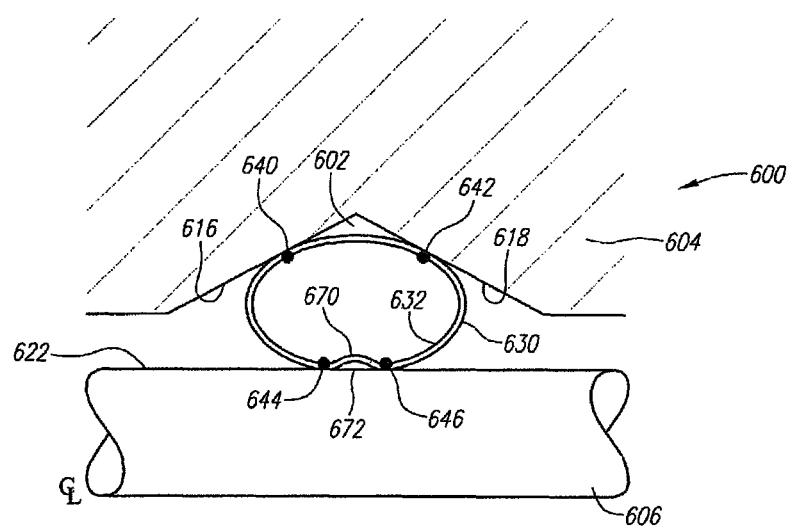
FIG. 14 is a side partial cross-sectional view of an electrical connector according to yet another exemplary embodiment.

FIG. 14 is a side partial cross-sectional view of an electrical connector assembly 600 according to yet another exemplary embodiment. The electrical assembly 600 may be referred to as a connector for a holding application incorporating a single groove 602. As shown, the groove 602 is located on or in the housing 604 and not the piston or shaft 606. The groove 602 on the housing 604 includes a first contact surface 616 and a second contact surface 618 that are oriented at an angle to one another to form a V-groove. However, other groove configurations having two slanted surfaces are contemplated.

When in use as an electrical connector, electrical current transferring to or from the housing 604 to the canted coil spring 630 having a spring coil 632 as shown passes through two contact points 640, 642 located between the housing and the canted coil spring. Accordingly, the transfer of current at the first contact point 640 creates a first contact resistance RC1 and transfer of current at the second contact point 642 creates a second contact resistance RC2.

Although the current assembly 600 incorporates a single groove 602, similar to the assembly 100 of FIG. 5, two additional contact points 644, 646 are provided between the spring coil 632 and the surface 622 of the piston 606 to form a four contact point electrical connector. More specifically, the present assembly, device and method incorporate four contact points in a single groove holding application. For a single coil 232, the four contact points are defined by two coil-to-housing contact points, 640, 642 and two coil-to-piston contact points 644, 646. Accordingly, the transfer of current at the third contact point 644 creates a first contact resistance RC3 and transfer of current at the fourth contact point 646 creates a fourth contact resistance RC4.

Thus, although only a single groove is used in the present assembly and device, like the assembly of FIG. 5, the current assembly has the same equivalent resistance Req as the circuit shown in FIG. 9 and is approximately 33% less than the equivalent resistance of the circuit in FIG. 6, which is the equivalent circuit for the assembly of FIG. 5. In one embodiment, the third contact point 644 and the fourth contact point 646 are formed by creating a dimple or arcuate surface 670 on the coil 632. For example, the coil can be subjected to pressure or impact against an anvil, pressurized by a specially designed clamp, or other post coffin treatment processes. The dimple or arcuate surface 670 creates a section having a discontinuity formed upon the coil. The discontinuity alters the curvature of the coil to create multiple contact points between the coil and the piston. In the present embodiment, two contact points are created by the discontinuity.

As understood, the present assembly, device, and method incorporate two contact points 644, 646 between a spring coil 632 and a surface 622, such as a surface of a piston, and wherein the surface 672 is generally constant or flat between the two contact points. In an alternative embodiment, a complex groove may be incorporated on the piston, similar to a Mansard roof with a flat bottom and two tapered side surfaces, to provide four contact points between the spring coil and the piston, with two created by the dimple on the coil and two by the geometry of the Mansard roof.

Thus, an aspect of the present method is further understood to include a method for forming a canted coil spring comprising coiling a wire to from a plurality of coils and canting the coils to cant along the same orientation. Forming a dimple on each of the plurality of coils to create coils with discontinuities for forming two contact points for each coil with a flat surface. The end coils can be welded to form a garter-type spring. In one example, the dimples can be created by pressuring or impacting the coils against one or more anvils. The anvils can have different sizes so that the dimples can be progressively formed to their final configuration. In another example, the coils can be pressurized by a specially designed clamp or other post coiling treatment processes.

Figure 15:
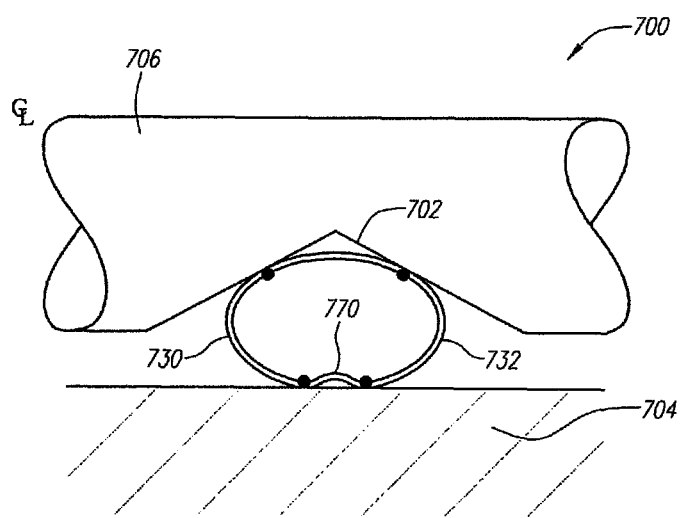
FIG. 15 is a side partial cross-sectional view of yet an electrical connector according to exemplary embodiment.

FIG. 15 is a side partial cross-sectional view of an electrical connector assembly 700 according to yet another exemplary embodiment. The electrical assembly 700 may be referred to as a connector for a holding application incorporating a single groove 702 and is similar to the assembly 600 of FIG. 14. However, in the present embodiment, the spring 730 having a spring coil 732 with a dimple or arcuate surface 770 is piston mounted. That is, the spring 730 is mounted in a groove 702 of a piston 706 as opposed to a housing 704. The housing has a generally flat surface. Although only a single groove is provided, four contact points are incorporated in the present embodiment. Furthermore, the present spring 730 and the spring 630 of FIG. 14 may be used in a two-groove configuration, with a groove in the housing and in or on the piston. Still furthermore, more than one spring may be used in parallel to decrease resistance. For example, two grooves 602 or 702 may be used side-by-side with two springs 630 or 730 in each of the grooves. In another embodiment, the groove 602 or 702 has a continuous contact surface with the coil 632 or 732, similar to the embodiment of FIG. 10 or 12. Still furthermore, two dimples may be formed on each coil of the plurality of coils. The two dimples on each coil is preferably located at opposed positions or locations on each coil.

In still yet another embodiment, a canted coil spring is provided having a plurality of coils. Wherein at least one of the coils of the plurality of coils incorporates a dimple defining a section of discontinuity formed upon the coil. In a prefer embodiment, a majority of the coils each having a dimple defining a section of discontinuity formed upon each coil. In yet another embodiment, all of the coils of the plurality of coils have a dimple defining a section having a discontinuity formed upon each coil.

The material from which the canted coil springs discussed above is constructed affects both the contact resistance and path resistance for the above-discussed electrical connectors depending on the operating environment of the electrical connectors. For example, a highly electrically conductive material such as copper provides a lower contact resistance and a lower path resistance than steel. Thus, the use of copper for the canted coil spring would be preferred for efficient electrical conduction. However, in certain applications, a canted coil spring formed entirely from copper may not be suitable. Most materials with high electrical conductivity have a relatively low melting point, resulting in limited temperature resistance and therefore limited applications. Accordingly, canted coil springs made of these highly conductive materials may lose a significant portion of their mechanical properties at high temperatures, thereby causing the locking mechanism or the electrical contact to become less effective or fail altogether. The decrease in strength limits the force that can be applied to electrically conductive canted coil springs, thereby also limiting the use of these canted coil springs in certain applications, especially those applications that require high mechanical forces in environments with elevated temperatures. The canted coil springs of the above embodiments can be made in a multi-metallic configuration having a temperature resistant metallic core such as steel with a highly conductive outer layer such as copper. Alternatively, the core can be constructed from a highly conductive material such as copper, and the outer layer can be constructed from a temperature resistant material such as steel. The canted coil spring can also be constructed from more than two metallic or non-metallic layers in various configurations in order to provide preferred operational properties for an electrical connector in which the canted coil spring is used. For example, a third corrosion resistant layer may be incorporated to limit corrosion. Further details about constructing a canted coil spring from multiple materials can be found in U.S. Patent Publications 2008/0254670, 2010/0029145, and 2010/0289198, the disclosures of which are expressly incorporated herein by reference.

One of ordinary skill in the art will readily recognize that the number of contact points may increase with the compression of the spring due to an increase in the contact area between the spring and the input side and/or the output side. The path resistance of the electrical connector may also decrease because of the compression of the spring. Thus, the operative compression range of the spring can be designed to provide preferred contact and/or path resistances for the electrical connector.

Accordingly, as understood from the present disclosure, a connector may be provided with relatively low electrical resistance by increasing the number of contacts, decreasing the path of resistance, incorporating multi-metallic materials, or combinations thereof to produce a low system resistance compared to similarly structured connectors without similar use of contacts, lower path resistance, and/or multi-metallic materials. Another feature of the present disclosure is the use of closely-spaced coils to provide more contact points than comparable canted coil springs with greater coil spacing.

The above description presents the best mode contemplated for the electrical connectors, in such full, clear, concise, and exact terms as to enable any person skilled in the art to which it pertains to make and use these connections. The electrical connectors, however, are susceptible to modifications and alternate constructions from that discussed above that are equivalent. Consequently, the electrical connectors are not limited to the particular embodiments disclosed. Furthermore, features, aspects, or functions specifically discussed for one embodiment but not another may similarly be incorporated in the latter provided the features, aspects and/or functions are compatible. For example, a connector may have both a continuous section contacting between a coil and a housing and as well as spaced apart contacts. Thus, the disclosure covers all modifications and alternate constructions coming within the spirit and scope of the disclosure as generally expressed by the following claims, which particularly point out and distinctly claim the subject matter of the disclosure.

What is claimed is:

1. A method of manufacturing an electrical connector with an equivalent resistance comprising:
    providing a housing made from, at least in part, an electrically conductive material;
    providing a pin made from, at least in part, an electrically conductive material;
    positioning a canted coil spring comprising a spring coil in a groove, said groove being associated with the housing, the pin, or both; and
    counting a first set of number of contact point or points between the spring coil and the housing and a second set of number of contact point or points between the spring coil and the pin;
    using Ohm's Law, the first set of number of contact point or points, and the second set of number of contact point or points to compute the equivalent resistance for the electrical connector.

2. The method of manufacturing of claim 1, further comprising associating the groove with the housing only.

3. The method of manufacturing of claim 1, further comprising associating the groove with the pin only.

4. The method of manufacturing of claim 1, wherein the first set of number of contact point or points is one, and the second set of number of contact point or points is one.

5. The method of manufacturing of claim 1, wherein the first set of number of contact point or points or the second set of number of contact point or points is two by forming a V-shape bottom wall in the groove.

6. The method of manufacturing of claim 1, wherein the first set of number of contact point(s) or the second set of number of contact point or point is two by forming a dimple on the coil to define a section having a discontinuity.

7. The method of manufacturing of claim 1, wherein the first set of number of contact point or points or the second set of number of contact point or points is two by forming the groove with two tapered sidewalls relative to a bottom wall.

8. The method of manufacturing of claim 1, wherein the contact between the spring coil and the housing or between the spring coil and the pin is along an arc length of the coil.

9. The method of manufacturing of claim 1, further comprising determining a first path length of the spring coil between the housing and the pin and a second path length of the spring coil between the housing and the pin.

10. The method of manufacturing of claim 9, further comprising using Ohm's Law, the first path length of the spring coil between the housing and the pin, and the second path length of the spring coil between the housing and the pin to compute the equivalent resistance for the electrical connector.

11. A method of manufacturing an electrical connector with an equivalent resistance comprising:
    providing a housing made from, at least in part, an electrically conductive material;
    providing a pin made from, at least in part, an electrically conductive material;
    positioning a canted coil spring comprising a spring coil in a groove, said groove being associated with the housing, the pin, or both;
    counting a first set of number of contact point or points between the spring coil and the housing and a second set of number of contact point or points between the spring coil and the pin; and
    determining a first path length of the spring coil between the housing and the pin and a second path length of the spring coil between the housing and the pin;
    using Ohm's Law, the first set of number of contact point or points, the second set of number of contact point or points, the first path length of the spring coil between the housing and the pin, and the second path length of the spring coil between the housing and the pin to compute the equivalent resistance for the electrical connector.

12. The method of manufacturing of claim 11, further comprising associating the groove with the housing only.

13. The method of manufacturing of claim 11, further comprising associating the groove with the pin only.

14. The method of manufacturing of claim 11, wherein the first set of number of contact point or points is one, and the second set of number of contact point or points is one.

15. The method of manufacturing of claim 11, wherein the first set of number of contact point or points or the second set of number of contact point or points is two by forming a V-shape bottom wall in the groove.

16. The method of manufacturing of claim 11, wherein the first set of number of contact point or points or the second set of number of contact point or points is two by forming a dimple on the coil to define a section having a discontinuity.

17. The method of manufacturing of claim 11, wherein the first set of number of contact point or points or the second set of number of contact point or points is two by forming the groove with two tapered sidewalls relative to a bottom wall.

18. The method of manufacturing of claim 11, wherein the contact between the spring coil and the housing or between the spring coil and the pin is along an arc length of the coil.

* * * * *

UNITED STATES PATENT AND TRADEMARK OFFICE
CERTIFICATE OF CORRECTION

| | | |
|---|---|---|
| PATENT NO. | : 8,844,126 B2 | Page 1 of 1 |
| APPLICATION NO. | : 13/315759 | |
| DATED | : September 30, 2014 | |
| INVENTOR(S) | : Jeff Frederick et al. | |

It is certified that error appears in the above-identified patent and that said Letters Patent is hereby corrected as shown below:

In the Specification

In column 4, line 42, delete "5,081,390;" and insert -- 5,082,390; --, therefor.

In column 8, line 10, delete "lame" and insert -- large --, therefor.

In column 11, line 11, delete "coffin" and insert -- coiling --, therefor.

Signed and Sealed this
Twenty-first Day of July, 2015

Michelle K. Lee
*Director of the United States Patent and Trademark Office*